(12) United States Patent
Suh et al.

(10) Patent No.: US 8,982,976 B2
(45) Date of Patent: Mar. 17, 2015

(54) SYSTEMS AND METHODS FOR TRELLIS CODED QUANTIZATION BASED CHANNEL FEEDBACK

(71) Applicant: FutureWei Technologies, Inc., Plano, TX (US)

(72) Inventors: Junghoon Suh, Kanata (CA); Osama Aboul-Magd, Kanata (CA)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/947,721

(22) Filed: Jul. 22, 2013

(65) Prior Publication Data

US 2015/0023440 A1 Jan. 22, 2015

(51) Int. Cl.
 *H04L 5/12* (2006.01)
 *H04B 7/04* (2006.01)
 *H04L 1/00* (2006.01)

(52) U.S. Cl.
 CPC .............. *H04B 7/0417* (2013.01); *H04L 1/006* (2013.01)
 USPC ............................................................ 375/262

(58) Field of Classification Search
 CPC ......................................................... H04L 1/006
 See application file for complete search history.

(56) References Cited

U.S. PATENT DOCUMENTS

| | | | | |
|---|---|---|---|---|
| 7,668,264 | B2 * | 2/2010 | Park et al. ....................... | 375/346 |
| 8,503,559 | B2 * | 8/2013 | Au-Yeung et al. ............ | 375/265 |
| 2001/0019591 | A1 * | 9/2001 | Jafarkhani et al. ............ | 375/265 |
| 2005/0078761 | A1 * | 4/2005 | Hottinen et al. ............... | 375/267 |
| 2006/0176977 | A1 * | 8/2006 | Jafarkhani et al. ............ | 375/298 |
| 2010/0135425 | A1 * | 6/2010 | Lo et al. ......................... | 375/260 |
| 2011/0134978 | A1 * | 6/2011 | Au-Yeung et al. ............. | 375/224 |
| 2012/0198303 | A9 * | 8/2012 | Song et al. ..................... | 714/758 |
| 2013/0003808 | A1 * | 1/2013 | Au-Yeung et al. ............. | 375/224 |
| 2013/0083743 | A1 * | 4/2013 | Koo et al. ....................... | 370/329 |
| 2013/0120867 | A1 * | 5/2013 | K. et al. .......................... | 360/39 |
| 2013/0290003 | A1 * | 10/2013 | Choo ............................. | 704/500 |
| 2014/0205044 | A1 * | 7/2014 | Lo et al. ......................... | 375/341 |

OTHER PUBLICATIONS

"IEEE Std 802.11, IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," IEEE Computer Society, Mar. 29, 2012, 2,793 pages.

(Continued)

*Primary Examiner* — Santiago Garcia
(74) *Attorney, Agent, or Firm* — Slater & Matsil, L.L.P.

(57) ABSTRACT

System and method embodiments are provided for Trellis Coded Quantization (TCQ) based channel feedback. The embodiments provide full channel state information with a short feedback size to a scheduler in order for the scheduler to apply advanced beamforming schemes, such as those designed in non-linear precoder methods. In an embodiment, a method in a station for providing channel feedback to a transmission point (TP) in a wireless system includes receiving a signal from the TP; estimating channel parameters for the signal; applying a TCQ scheme to the estimated channel parameters to map the channel estimate parameters to trellis codes; and transmitting full channel state information to the TP, wherein the full channel state information comprises output of a Viterbi algorithm (VA) corresponding to the trellis codes.

34 Claims, 5 Drawing Sheets

(56) References Cited

OTHER PUBLICATIONS

Park, M., "IEEE P802.11 Wireless LANS: Proposed Specification Framework for TGah," IEEE 802.11-12/1406r0, Nov. 15, 2012, 51 pages.

Marcellin, M.W., "Trellis Coded Quantization of Memoryless and Gauss-Markov Sources," IEEE Transactions on Communications, Jan. 1990, pp. 82-93, vol. 38, Issue 1.

Ungerboeck, G., "Channel Coding with Multilevel/Phase Signals," IEEE Transactions on Information Theory, Jan. 1982, pp. 55-67, vol. 28, Issue 1.

Perahia, E. et al., "Next Generation Wireless LANs Throughput, Robustness, and Reliability in 802.11n," Aug. 2008, 416 pages, Cambridge University Press, New York.

"Draft Standard for Information Technology—Telecommunications and information exchange between systems—Local and metropolitan area networks—Specific requirements: Part 11: Wireless LAN Medium Access Control (MAC) and Phyical Layer (PHY) specifications," IEEE P802.11ac/D3.0, Jun. 2012, 385 pages.

"Draft Standard for Information Technology—Telecommunications and information exchange between systems—Local and metropolitan area networks—Specific requirements: Part 11: Wireless LAN Medium Access Control (MAC) and Physical Layer (PHY) specifications," IEEE P802.11ac/D4.0, Oct. 2012, 408 pages.

\* cited by examiner

SYSTEMS AND METHODS FOR TRELLIS CODED QUANTIZATION BASED CHANNEL FEEDBACK

TECHNICAL FIELD

The present invention relates to a system and method for wireless communications, and, in particular embodiments, to a system and method for channel feedback in Wi-Fi.

BACKGROUND

New technologies such as coordinated multi-point (CoMP), interference alignment (IA), dirty paper coding (DPC), massive multiple-input multiple-output (MIMO), etc. may be some of the keys to capacity enhancement for wireless systems. However, all of the benefits provided by these technologies may not be realized due to the requirements for precise channel knowledge. For example, current channel feedback schemes limit the transmission (Tx) beamforming (BF) design. However, full channel state information (CSI) knowledge is necessary at the scheduler in order to apply advanced BF schemes such as those designed in non-linear precoder design methods for multi-user (MU)-MIMO or CoMP-like system.

SUMMARY OF THE INVENTION

In accordance with an embodiment, a method in a station for providing channel feedback to a transmission point (TP) in a wireless system includes receiving a signal from the TP; estimating channel parameters for the signal; applying a Trellis Coded Quantization (TCQ) scheme to the estimated channel parameters to map the channel estimate parameters to trellis codes; and transmitting full channel state information to the TP, wherein the full channel state information comprises output of a Viterbi algorithm (VA) corresponding to the trellis codes.

In accordance with another embodiment, a network component configured for providing channel feedback to a transmission point (TP) in a wireless system includes a processor and a computer readable storage medium storing programming for execution by the processor, the programming including instructions to: receive a signal from the TP; estimate channel parameters for the signal; apply a Trellis Coded Quantization (TCQ) scheme to the estimated channel parameters to map the channel estimate parameters to trellis codes; and transmit full channel state information to the TP, wherein the full channel state information comprises output of a Viterbi algorithm (VA) corresponding to the trellis codes.

In accordance with another embodiment, a method in a transmission point (TP) for determining channel state information from channel feedback from a station in a wireless system includes receiving channel feedback from a station, wherein the channel feedback comprises a trellis coded quantization (TCQ) information about a channel and determining full channel state information according to the channel feedback.

In accordance with another embodiment, a network component configured for determining full channel state information from channel feedback from a station in a wireless system includes a processor and a computer readable storage medium storing programming for execution by the processor, the programming including instructions to: receive channel feedback from a station, wherein the channel feedback comprises a trellis coded quantization (TCQ) information about a channel, and determine full channel state information according to the channel feedback.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
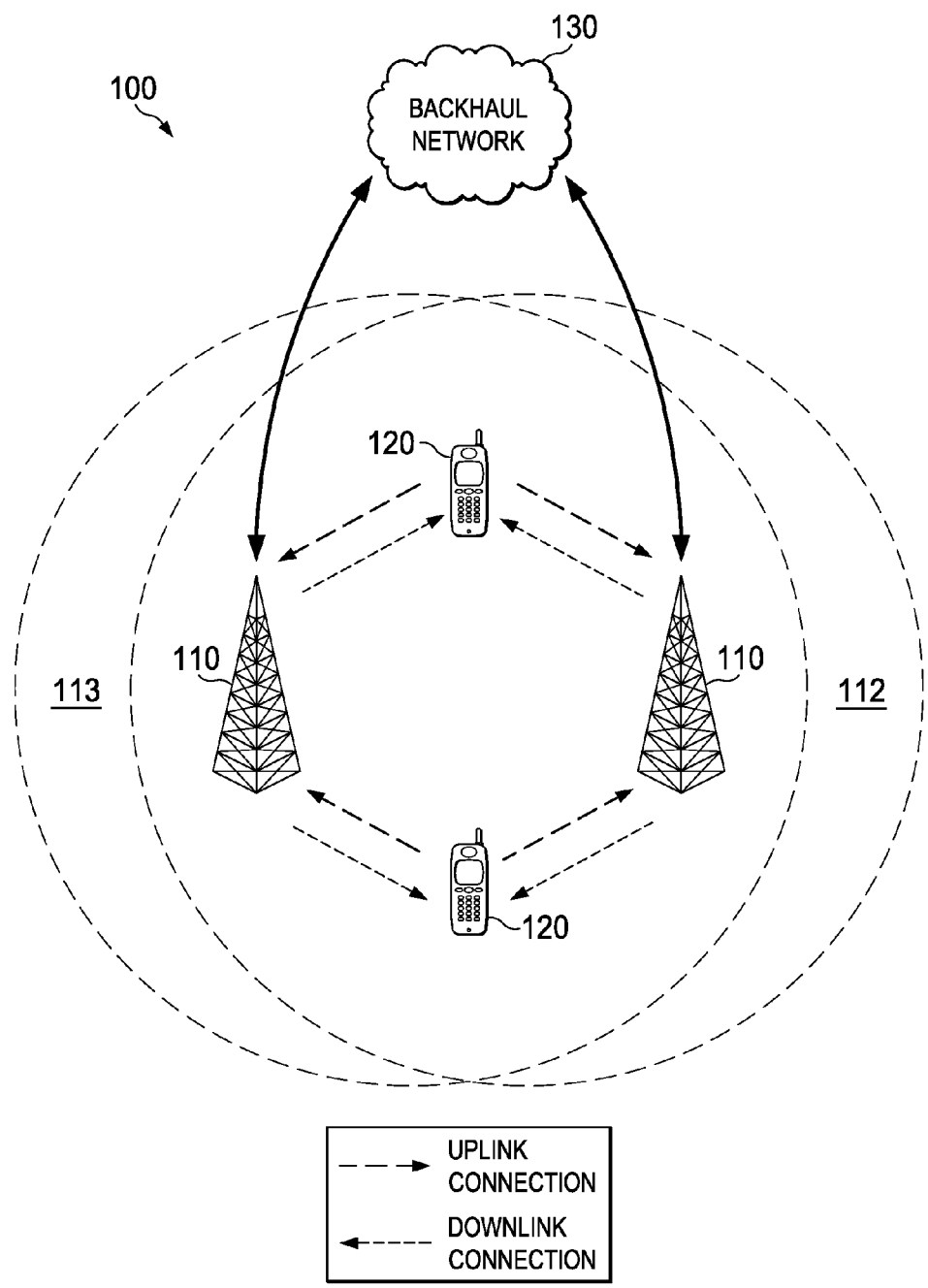
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are systems and methods to use Trellis Coded Quantization (TCQ) for MIMO channel feedback for a wireless communication system. Also disclosed is an enhanced TCQ algorithm with a further reduced quantization size. Accurate channel information is important for the successful operations of Single User (SU)-MIMO, MU-MIMO, or Network MIMO (Cooperative MU-MIMO among multiple access points (APs) or Base Stations (BSS)).

In an embodiment, the schedulers (APs or BSS) that want to run the MIMO schemes need to know the downlink (DL) MIMO channels for the Transmitter Beamforming (TxBF). This is especially true when the advanced MIMO schemes, such as non-linear precoded MIMO, need to be applied, since the full CSI channel knowledge needs to be known at the schedulers. However, one issue is the cost. The more accurate channel knowledge the schedulers need, the larger the size of the channel feedback that has been necessary.

Disclosed are embodiment methods and systems for a TCQ based channel feedback. In an embodiment, the feedback size is reduced to about 10% of the current specified Institute of Electrical and Electronics Engineers (IEEE) 802.11n full channel CSI feedback size. Furthermore, embodiments of the disclosed systems and methods still accommodate the application of any kind of MIMO beamforming (BF) schemes including even the dirty paper coding (DPC), one of the most complicated non-linear type of MIMO precoding schemes. Although described herein primarily with reference to IEEE 802.11 Wi-Fi systems, embodiments of the disclosed systems and methods may be applied to any wireless communication system.

In an embodiment, a Trellis Coded Quantization (TCQ) algorithm for the channel feedback is applied in any Wireless system including a Wi-Fi or a Cellular system.

In an embodiment, the output of a Viterbi Algorithm (VA), which is the input of a corresponding convolutional encoder, is the quantized feedback (FB) information. In the case where the real and imaginary parts from the estimated channel parameters are separated, the output of a VA per each trellis stage represents a real or imaginary part of a channel parameter per subcarrier. As used herein, the term "stage" or "trellis stage" represents the sequence of the trellis navigation, that is, it represents a time (sequence) index. The length of the trellis depends on the size of the MIMO configuration in addition to the number of subcarriers.

In an embodiment, the beginning state index for a survival path is found through a back-trace VA. The beginning state is the feedback to the AP or BSS, depending on the wireless system, together with the quantized FB. Unlike other schemes where the input bits to VA also need to be provided for quantization in addition to the output bits (i.e., for the rate 2/3 Bitwise Convolutional Codes (BCC), the three input bits as well as the two output bits need to be used for quantization with the original TCQ), those three input bits to VA are not necessary with the disclosed embodiment. Eliminating those three input bits reduces the quantization size further. In an embodiment, the index of the beginning state is dependent on the size of a total number of states.

In an embodiment, the estimated channel parameters are normalized into a certain range based on the Tx power of the AP or TP, Receiver (Rx) power of the station (STA) or user equipment (UE) (i.e., a wireless device), and the path loss information. In an embodiment, the normalization factor is fed back to the AP or BSS, too.

In an embodiment, if the estimated full channel knowledge is assigned to any given trellis, the total feedback size is the output bits (depending on the code rate) per trellis stage times the length of the trellis stage, added by the index of a beginning state (depending on the size of the state) and the normalization factor (which can be set to be fed back in one byte in an embodiment).

In an embodiment, the trellis does not begin from the state zero when the VA is run for quantization. The forward state transition function is used to navigate the trellis from the first stage to the last stage. Any incoming branch information (index of an incoming branch) to any node will be determined after adding the sum computation of branch metric with the departure node metric (the previous node metric). Since, in an embodiment, there are four incoming branches to any node, whichever has the minimum added sum metric between the departure node metric and the incoming branch metric will survive in the competition and this new node metric is used for the next node metric computation. The branch index of the survival incoming branch to any node will be saved. This saved information will be used to navigate back from the last stage to the first stage. The new updated node metric will become the previous node metric as the trellis navigates, and the current updated node metric will be swapped with the previous node metric (the pointers of the current node metric may only be swapped with the pointers of the previous node metric) to get ready for the computation of the next node metric. The scheme navigates the forward transition from the first stage to the last stage, and when the last stage is reached, one node is found which has a minimum value for the node metric. That node becomes the beginning node for the back-trace. Since there is only one surviving incoming branch per node, the scheme may navigate the backward transition in a straight forward manner. There is a saved survival branch index, and its corresponding VA output bits which is the quantization output. The saved survival branch index determines the next node index when the trellis is traced back.

When the trellis reaches the first trellis stage, the node with the minimum node metric becomes the beginning state of the convolutional encoder in AP or BSS depending on the wireless system. In an embodiment, the beginning state information needs to be fed back with the quantization output. The convolutional encoder in the AP or BSS takes the beginning state and the quantization bits which are the outputs of VA from each STA or UE, and figures out the matching branch label based on the convolutional encoder output using the forward state transition function. The convolutional encoder only needs the beginning state and the input bits to determine the next state in the trellis, if the forward state transition function is used, which ends up making the convolutional encoder simpler than conventional convolutional encoders.

In an embodiment, full CSI knowledge is available at the schedulers, which enables the various BF schemes to apply various MIMO schemes including non-linear precoder design. Furthermore, in an embodiment, channel feedback for BF is reduced by 90% from that of existing FB schemes. The disclosed systems and methods have shorter BF feedback size than the existing angle quantized BF feedback, but with better performance and degree of freedom in designing the TxBF.

In the current orthogonal frequency-division multiplexing (OFDM) based 802.11 Wi-Fi system, the estimated channel at each STA is processed further through a Singular Value Decomposition (SVD) operation, and one of the output V matrix with Eigen vectors is angle-quantized and fed back to the AP. However, the limited channel information with the V matrix cannot accommodate advanced TxBF designs, such as a non-linear precoder design which requires full channel knowledge (not just the V matrix) at the AP. Disclosed embodiment systems and methods quantize the estimated channel at each STA using a TCQ algorithm and feed it back to the AP.

In an embodiment, the trellis length depends on a number of subcarriers of an orthogonal frequency-division multiplexing (OFDM) symbol and a size of a multiple-input multiple-output (MIMO) antenna configuration in the AP or TP.

FIG. 1 illustrates a network 100 for communicating data. The network 100 comprises a multiple access points (APs) 110 that have overlapping coverage areas 112, 113, a plurality of user equipment (UEs) 120, and a backhaul network 130. As used herein, the term AP may also be referred to as a transmission point (TP) and the two terms may be used interchangeably throughout this disclosure. Also, as used herein, the term UE may also be referred to as STA and the two terms may be used interchangeably throughout this disclosure. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the APs 110 and a remote end (not shown). In some embodiments, the network 100 may comprise various other wireless devices, such as relays, femtocells, etc.

Figure 2:
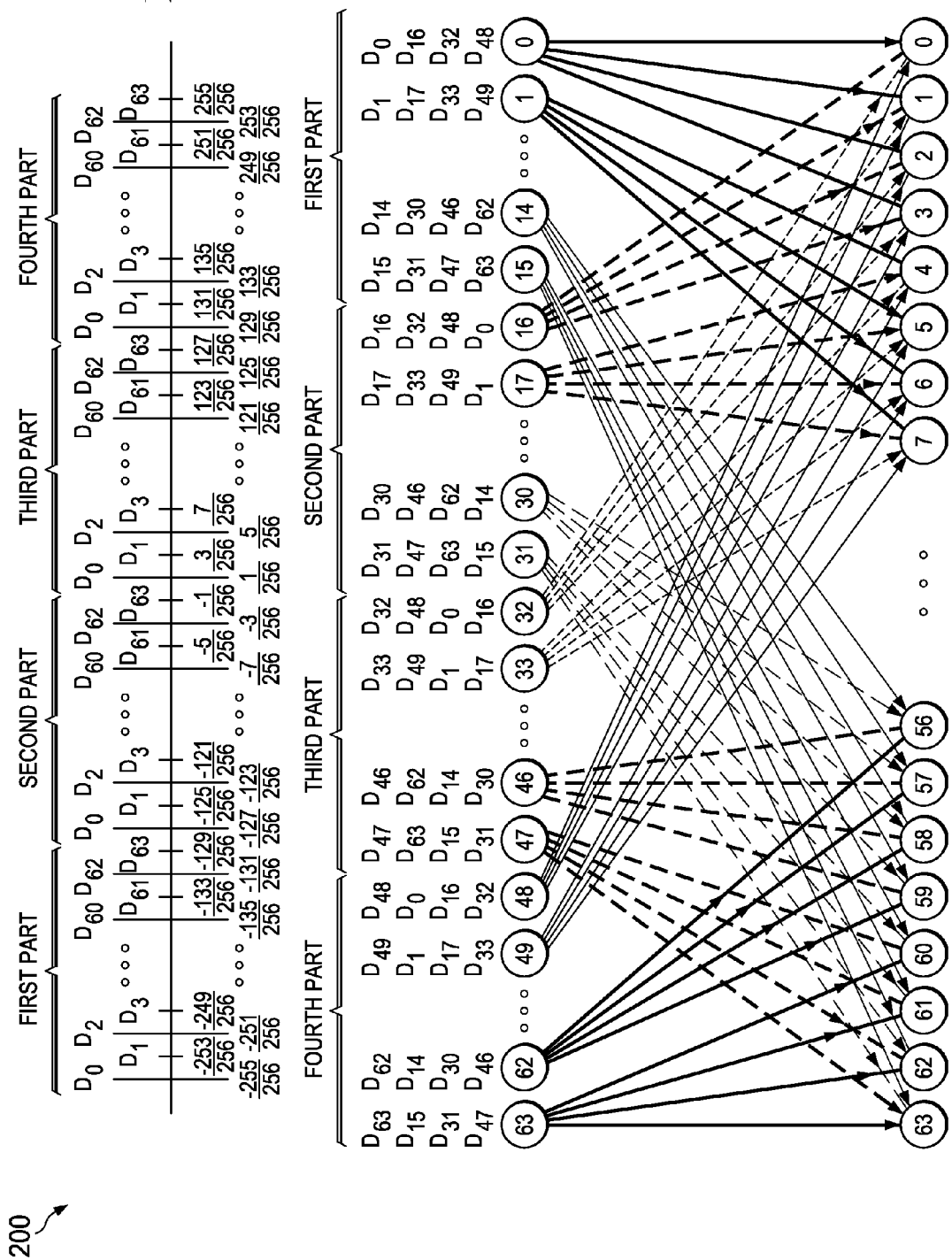
FIG. 2 is an example embodiment of a trellis diagram and its quantization level allocation (64 State-4 Branches per node)

FIG. 2 is an example embodiment of a trellis diagram 200 and its quantization level allocation (64 State-4 Branches per node). In an embodiment, the 256 quantization levels are allocated over to the trellis diagram as shown in FIG. 2. As for the normalized channel parameter (h, $|h|<=1$), the quantization points are $\pm(2n-1)|h|/256$, $n=1, 2, \ldots, 128$, which are assigned to the 4 different parts of branch label, $D_0, \ldots, D_{63}$. FIG. 2 shows how the 4 parts of branch labels are allocated to the disclosed trellis diagram.

Figure 3:
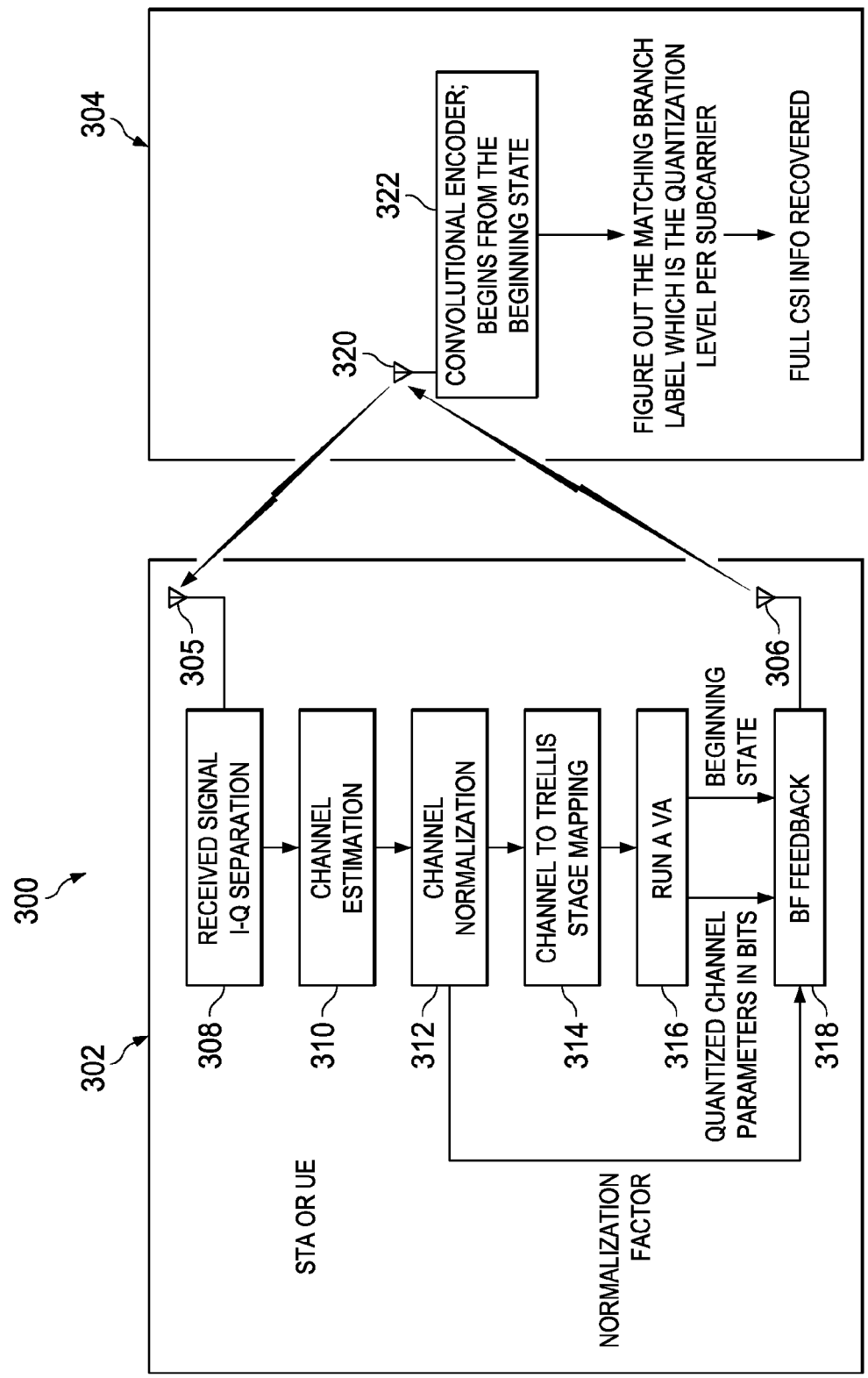
FIG. 3 illustrates an embodiment system and method for TCQ based channel feedback.

FIG. 3 illustrates an embodiment system 300 and method for TCQ based channel feedback. System 300 includes a STA 302 and an AP 304. The AP includes a transceiver 320 and a convolutional encoder 322. The STA 302 includes a receiver 305, a transmitter 306, a received signal I-Q separation unit 308, a channel estimation unit 310, a channel normalization unit 312, a channel to trellis stage mapping unit 314, a Viterbi Algorithm (VA) execution unit 316, and a BF feedback unit 318.

The received signal I-Q separation unit 308 receives signals from the receiver 305 and separates the signal into its real and imaginary components. The real and imaginary components are provided to the channel estimation unit 310. The channel estimation unit 310 estimates channel parameters for both the real and imaginary components of the received signal and provides the estimated channel parameters to the channel normalization unit 312.

The STA 302 knows the Tx power level, the Rx power level, and thus, the channel path loss, which makes channel normalization possible at each STA 302 with the channel normalization unit 312. The normalization will force the estimated channel parameters to be in a certain range. The normalization of the channel parameters is the preparation of the TCQ based channel feedback. In an embodiment, the range of the channel parameters is set to be in between −1 and 1 through the channel normalization and truncation. The actual channel parameters are Gaussian distributed complex numbers and may be represented in the magnitude and the angle form, where the probability distribution of the magnitude and the angles are Rayleigh distributed and Uniform distributed, respectively. The uniform sources may be the easiest to apply the TCQ algorithm, but the Gaussian sources may be easier than the Rayleigh distributed sources for the application of TCQ algorithm.

The channel to Trellis code mapping unit 314 maps the normalized channel estimates to a trellis codes. In an embodiment, a TCQ algorithm is applied to the raw channel parameters (i.e., the estimated channel parameters from channel estimation unit 310), but it may be applied to the magnitude and angle form of complex channel parameters as well.

As for those normalized raw channel parameters in the range from −1 to 1, a 64-state and 4-branches-per-node type of trellis is applied for the description of TCQ based channel feedback in an embodiment. However, embodiment systems and methods may be applied to any type of trellises with any size of states and branches.

The forward state transition function for the afore mentioned trellis scheme is $S_i=(S_{i-1}*4)/64+u_i$, where the i represents the trellis stage index, thus $S_i$ represents a node (state) at the ith stage. The $u_i$ represents the input bits, where two bits are assigned for an input with the four branch paths per node (state) emanated, and thus, the $u_i$ is an integer from 0 to 3. Each trellis stage corresponds to the channel parameter per sub-carrier, per real or imaginary part, and per channel link between Tx and Rx.

In an embodiment, there are total 256 (64*4) paths in one trellis stage, that is, the channel parameters may be decomposed in 256 quantization levels. The 256 levels may be assigned uniformly between −1 and 1 using a Lloyd-Max scalar quantizer, but the quantization level may be optimized using a different quantizer and allocate it to the trellis.

Once trellis scheme 200 is set and its corresponding quantization points are set, a Viterbi Algorithm (VA) is executed in VA execution unit 316 to get the channel quantization bits. A back-trace VA is used to get the beginning state for the survival path in the total trellis. In a typical bitwise channel decoder trellis diagram, input-output bits are assigned to each state transition branch based on its coding rate, and the VA is used to determine the input bits based on the minimum Euclidean distance between the received signal per bits (a Log-likelihood ratio computation is executed in order to extract a soft bit information when a higher Quadrature amplitude modulation (QAM) sized symbol is transmitted) and the corresponding channel encoder's output bit.

In embodiment of the disclosed TCQ based channel feedback, the Euclidean distance between the actual channel parameter and the branch label is computed, and a determination of the corresponding input bits is made, which will be used for the channel quantization bits. When the real and imaginary part of the estimated channel parameters per OFDM symbol are separated in a Wi-Fi system, each subcarrier of a real or an imaginary part of the channel parameters per OFDM symbol will be assigned to each trellis stage. In case of MIMO channel, each MIMO channel link per OFDM symbol between the Tx and Rx will be assigned to each trellis stage. Hence, the total length of the trellis stage is the number of total subcarriers per OFDM symbol times 2 (the real and imaginary parts), and multiplied by the number of MIMO channel links. Since the rate 2/3 convolutional coder is used in FIG. 2, the quantization number of bits per trellis stage is 2, so the total feedback bit size may be inferred using the TCQ.

The BF feedback unit receives the normalization factor from the channel normalization unit 312, a beginning state from the VA execution unit 316, and quantized channel parameters in bits from the VA execution unit 316. Once the trellis scheme, size of the MIMO channel links, and the length of an OFDM symbol is set, it is straight forward to get the total bit size of a TCQ based channel feedback. The TCQ based channel feedback is provided to the transmitter 306 by the BF feedback unit 318 and transmitted back to the AP 304.

In an embodiment, a back-traced VA is run over the total trellis length. It is not necessary to begin travelling the trellis with the state zero. Instead, the Euclidean distances for all the branches per trellis stage are computed and an attempt is made to make a transition from one stage to another using the forward state transition function discussed above for the trellis in FIG. 2. Each node at the next trellis stage has 4 incoming branches. The node metric at the ith stage is computed by adding the node metric at the i−1th stage with the branch metric (computation of the Euclidean distance between the channel parameter in the stage and the branch label for the transition branch). Each node (state) at the ith trellis stage has 4 incoming branches. Each node at the ith stage compares the node metric for those 4 incoming branches and saves one branch with the minimum node metric. There will be one survival branch per node at each stage. There is a corresponding back-trace index per each branch, and it should be saved as the survival branch information. That is, the $\lfloor S_{i-1}/4 \rfloor$ value is saved as a survival branch information. This process will be repeated to the end of the trellis.

Once the last trellis stage is reached, the node metric for all the nodes (states) at the last trellis stage are compared, and one state with the minimum node metric is selected, so that the back trace travel at the last stage might begin from the node with the minimum node metric. The backward state transition function is $S_{i-1}=\lfloor S_i/4 \rfloor + 16*u_b$, where $\lfloor \ \rfloor$ represents the floor operation. If the back-trace is started from one node at the last stage, there should be only one corresponding survival branch saved during the forward trellis transitions. Hence, the $u_b$ is the survival branch information for the backward trellis transition. Therefore, the input bits are determined to be $S_i\%4$ where $S_i$ represents the survival node index at the ith stage.

When a trace back is performed, the node index reached at the last stage of the backward trellis becomes the beginning state (node) of the corresponding convolutional encoder. The index of the beginning state will be fed back to the AP or BSS together with the quantization bit per subcarrier and per MIMO channel link. That is, the overall feedback information will be the 6 bit index of the beginning state, 2 bit quantization channel info per stage over the total trellis length, and the normalization factor which normalized the absolute value of the estimated channel parameters to be less than or equal to 1.

If it is assumed that the normalization factor is one byte long and a 20 MHz transmission, the following table of total feedback size compared with the feedback size of the existing Specification is produced.

TABLE 1

Total feedback size in bits for 20 MHz Wi-Fi packet per OFDM symbol for 3 FB schemes

| MIMO Size | Proposed TCQ based FB (bits) | Full CSI FB based on 802.11n (bits) | | | | Angle quantized V FB based on 802.11ac (bits) | | | |
|---|---|---|---|---|---|---|---|---|---|
| | | 4 | 5 | 6 | 8 | 1 | 2 | 3 | 4 |
| 2 × 2 | 1038 | 4480 | 5504 | 6528 | 8576 | 640 | 1280 | 2560 | 5120 |
| 3 × 3 | 2318 | 9600 | 11904 | 14208 | 18816 | 1920 | 3840 | 7680 | 15360 |
| 4 × 2 | 2062 | 8576 | 10624 | 12672 | 16768 | 3072 | 6144 | 12288 | 24576 |
| 4 × 4 | 4110 | 16768 | 20864 | 24960 | 33152 | 3840 | 7680 | 15360 | 30720 |

Once the TCQ based channel feedback is received at the AP 304 (or BSS, depending on the wireless system), the convolutional encoder 322 corresponding to the VA used at each STA 302 or UE will run to get the quantized channel parameters. The convolutional encoder 304 will begin from the beginning state, one of the feedback information, with the input bits which are the output bits of VA at each STA 302 or UE, and fed back. There are branch labels at each branch based on the quantizer's scheme and its quantization level, thus, the beginning node and the input bits will determine the matching branch label, which will be the reconstructed channel parameters at the AP 304 or BSS.

Figure 4:
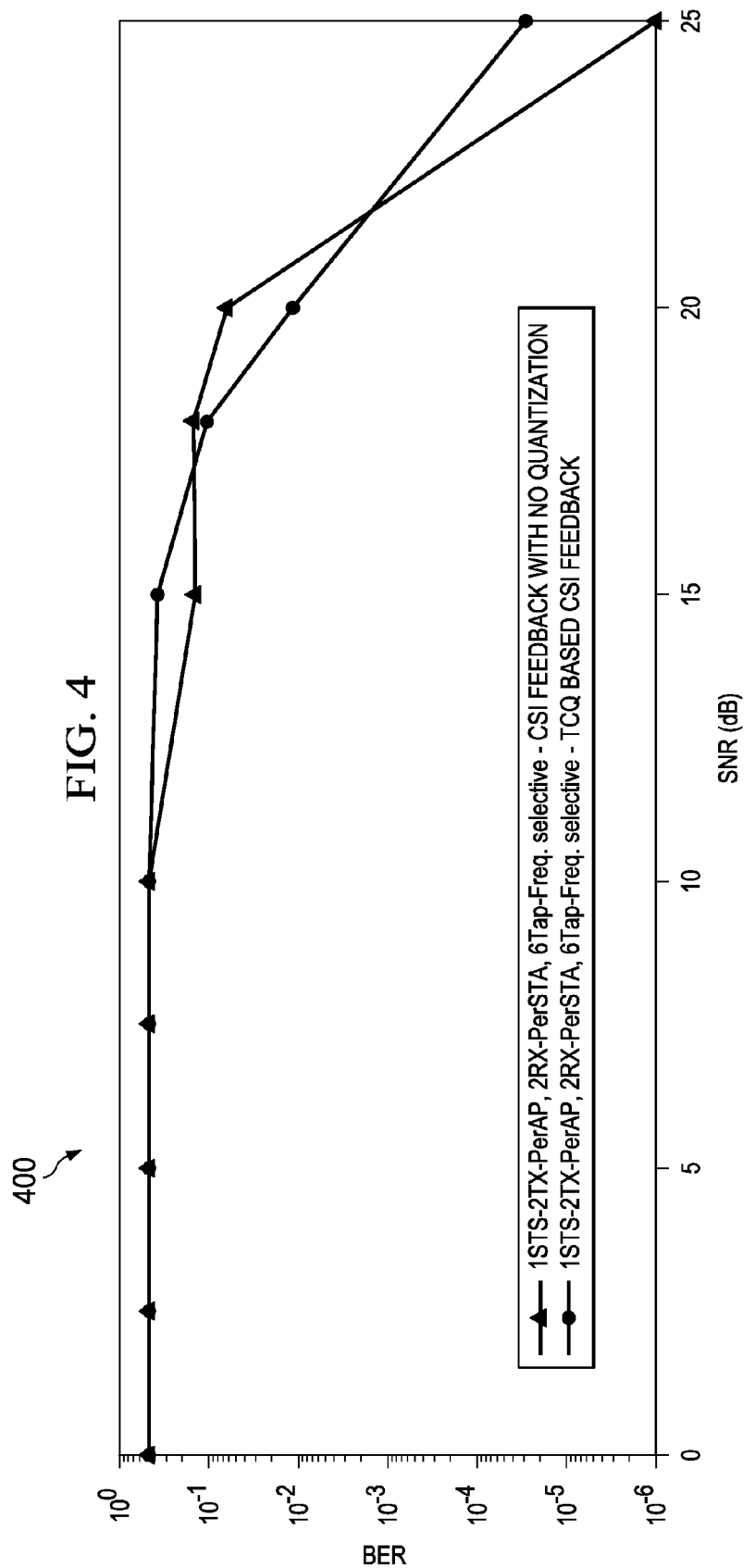
FIG. 4 shows a graph of BER Performance comparison between TCQ based Channel Feedback and Full Channel Feedback without Quantization for a two AP collaborated Wi-Fi system.

FIG. 4 shows a graph 400 of Bit Error Rate (BER) Performance comparison between TCQ based Channel Feedback and Full Channel Feedback without Quantization for a 2 AP collaborated Wi-Fi system. FIG. 4 also shows the BER performance comparison of Wi-Fi systems with the TCQ based channel feedback or with no channel quantization error. In the depicted example, the comparison is for a two AP collaboration system, and each AP with a single stream with two Txs. It is also assumed that there are ten STAs in the network before the user selection, and two STAs will be selected after the user selection. The 6-tap frequency selective channels are generated. The user selection and beamforming selection are done in accordance with methods in which the accurate channel information is a critical factor for the AP collaborated Wi-Fi system to work.

As seen from FIG. 4, for the two AP collaborated Wi-Fi system, the TCQ based channel feedback does not affect the overall performance of User Selection or Beam Selection, and ends up showing no change in the overall BER performance. It may be concluded that there is virtually little degradation in performance with the TCQ based channel feedback.

The following references are incorporated herein by reference in their entirety:

Michael W. Marcellin and Thomas Fischer, "Trellis Coded Quantization of Memoryless and Gauss-Markov Sources," IEEE Transactions and Communications, vol. 38, No. 1, January 1990.

Gottfried Ungerboeck, "Channel Coding with Multilevel/Phase Signals," IEEE Transactions on Information Theory, vol. IT-28, pp. 55-67, January 1982.

Figure 5:
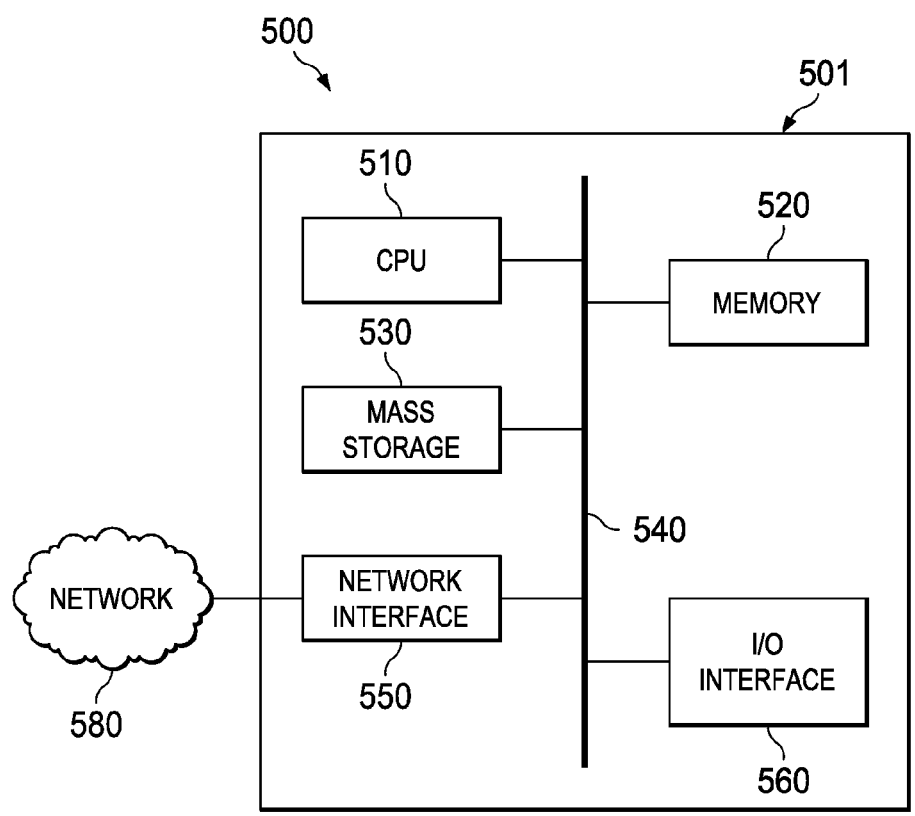
FIG. 5 is a processing system that can be used to implement various embodiments.

FIG. 5 is a block diagram of a processing system 500 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, memory 520, a mass storage device 530, a network interface 550, and an I/O interface 560 connected to a bus 540.

The bus 540 may be one or more of any type of several bus architectures including a memory bus or memory controller, a peripheral bus, video bus, or the like. The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs.

The mass storage device 530 may comprise any type of storage device configured to store data, programs, and other information and to make the data, programs, and other information accessible via the bus 540. The mass storage device 530 may comprise, for example, one or more of a solid state drive, hard disk drive, a magnetic disk drive, an optical disk drive, or the like.

The I/O interface 560 may provide interfaces to couple external input and output devices to the processing unit 501. The I/O interface 560 may include a video adapter. Examples of input and output devices may include a display coupled to the video adapter and a mouse/keyboard/printer coupled to the I/O interface. Other devices may be coupled to the processing unit 501, and additional or fewer interface cards may be utilized. For example, a serial interface such as Universal Serial Bus (USB) (not shown) may be used to provide an interface for a printer.

The processing unit 501 may also include one or more network interfaces 550, which may comprise wired links, such as an Ethernet cable or the like, and/or wireless links to access nodes or different networks. The network interface 501 allows the processing unit to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a station for providing channel feedback to a transmission point (TP) in a wireless system, the method comprising:
   receiving a signal from the TP;
   estimating channel parameters for the signal;
   normalizing the estimated channel parameters into a predefined range according to a transmission power of the TP, a receiver power of the station, and path loss information;
   applying a Trellis Coded Quantization (TCQ) scheme to the normalized estimated channel parameters to map the channel estimate parameters to trellis codes; and
   transmitting full channel state information to the TP, wherein the full channel state information comprises output of a Viterbi algorithm (VA) corresponding to the trellis codes.

2. The method of claim 1, wherein a trellis length depends on a number of subcarriers of an orthogonal frequency-division multiplexing (OFDM) symbol and a size of a multiple-input multiple-output (MIMO) antenna configuration in the TP.

3. The method of claim 1 further comprising executing the VA on the corresponding trellis codes to determine quantized channel parameters in bits and a beginning state, wherein the full channel state information comprises the quantized channel parameters in bits and the beginning state.

4. The method of claim 3, wherein real and imaginary parts of the channel parameters are separately quantized.

5. The method of claim 3, wherein the full channel state information comprises a beginning state of a survival path and an output bit of the VA.

6. The method of claim 1, further comprising normalizing the estimated channel parameters into range with a normalizing factor according to transmission power of the TP, receiver power of the station, and path loss information.

7. The method of claim 6, wherein the full channel state information comprises the normalizing factor.

8. The method of claim 1, wherein a total feedback size of the full channel state information comprises output bits per trellis stage multiplied by a length of the trellis stage added by an index of a beginning state and bits for a normalization factor for normalizing the estimated channel parameters.

9. The method of claim 8, wherein the output bits are dependent on a code rate.

10. The method of claim 8, wherein the index of the beginning state is dependent on the size of a total number of states.

11. The method of claim 8, wherein the normalization factor is set to be fed back to the TP in one byte.

12. The method of claim 1, further comprising:
    executing a Viterbi algorithm (VA) on the trellis codes using a forward state transition function to navigate the trellis from a first trellis stage to a last trellis stage, wherein incoming branch information to a node is determined after adding a sum computation of an incoming branch metric with a departure node metric, wherein a one of the departure node metric and the incoming branch metric that has a minimum added sum metric is a surviving node and is used as a new node metric in a next node metric computation;
    saving a branch index of a the surviving node, wherein the branch index of the surviving node is used to navigate back from the last trellis stage to the first trellis stage;
    navigating a forward transition from the first trellis stage to the last trellis stage; and
    determining a node whose node metric has a minimum value, wherein the node whose node metric has the minimum value at the last trellis stage is a beginning node for a back trace.

13. The method of claim 12, further comprising providing a survival branch index and VA output bits corresponding to the survival branch index as quantization output to the TP.

14. The method of claim 1, wherein the wireless system comprises one of a Wi-Fi system or a cellular system.

15. A network component configured for providing channel feedback to a transmission point (TP) in a wireless system comprising:
    a processor; and
    a non-transitory computer readable storage medium storing programming for execution by the processor, the programming including instructions to:
    receive a signal from the TP;
    estimate channel parameters for the signal;
    normalize the estimated channel parameters into a predefined range according to a transmission power of the TP, a receiver power of the station, and path loss information;
    apply a Trellis Coded Quantization (TCQ) scheme to the normalized estimated channel parameters to map the channel estimate parameters to trellis codes; and
    transmit full channel state information to the TP, wherein the full channel state information comprises output of a Viterbi algorithm (VA) corresponding to the trellis codes.

16. The network component of claim 15, wherein a trellis length depends on a number of subcarriers of an orthogonal frequency-division multiplexing (OFDM) symbol and a size of a multiple-input multiple-output (MIMO) antenna configuration in the TP.

17. The network component of claim 15, wherein the programming further comprises instructions to execute the VA on trellis stages to determine quantized channel parameters in bits and a beginning state, wherein the full channel state information comprises the quantized channel parameters in bits and the beginning state.

18. The network component of claim 17, wherein real and imaginary parts of the channel parameters are separately quantized.

19. The network component of claim 17, wherein the full channel state information comprises a beginning state of a survival path and an output bit of the VA.

20. The network component of claim 15, wherein the programming further comprises instructions to normalize the estimated channel parameters into range with a normalizing factor according to transmission power of the TP, receiver power of a station, and path loss information.

21. The network component of claim 20, wherein the full channel state information comprises the normalizing factor.

22. The network component of claim 15, wherein a total feedback size of the full channel state information comprises output bits per trellis stage multiplied by a length of the trellis stage added by an index of a beginning state and bits for a normalization factor to normalize the estimated channel parameters.

23. The network component of claim 22, wherein the output bits of the VA are dependent on a code rate.

24. The network component of claim 22, wherein the index of the beginning state is dependent on the size of a total number of states.

25. The network component of claim 22, wherein the normalization factor is set to be fed back to the TP in one byte.

26. The network component of claim 15, wherein the programming further comprises instructions to:
execute a Viterbi algorithm (VA) on the trellis codes using a forward state transition function to navigate the trellis from a first trellis stage to a last trellis stage, wherein incoming branch information to a node is determined after adding a sum computation of an incoming branch metric with a departure node metric, wherein a one of the departure node metric and the incoming branch metric that has a minimum added sum metric is a surviving node and is used as a new node metric in a next node metric computation;
save a branch index of a the surviving node, wherein the branch index of the surviving node is used to navigate back from the last trellis stage to the first trellis stage;
navigate a forward transition from the first trellis stage to the last trellis stage; and
determine a node whose node metric has a minimum value at the last trellis stage, wherein the node whose node metric has the minimum value at the last trellis stage is a beginning node for a back trace.

27. The network component of claim 26, wherein the programming further comprises instructions to provide a survival branch index and VA output bits corresponding to the survival branch index as quantization output to the TP.

28. The network component of claim 15, wherein the wireless system comprises one of a Wi-Fi system or a cellular system.

29. A method in a transmission point (TP) for determining channel state information from channel feedback from a station in a wireless system, the method comprising:

receiving channel feedback from a station, wherein the channel feedback comprises a trellis coded quantization (TCQ) information about a channel determined according to a normalized estimated channel parameters, wherein the normalized estimated channel parameters are determined according to a transmission power of the TP, a receiver power of the station, and path loss information; and determining full channel state information according to the channel feedback.

30. The method of claim 29, wherein the TCQ information comprises a survival branch index and corresponding Viterbi algorithm (VA) output bits, wherein the VA output bits are determined by the station by applying the VA to trellis codes mapped from channel estimation parameters of a signal received by the station.

31. The method of claim 30, further comprising:
receiving beginning state information from the station; and
retrieving a matching branch label according to the beginning state information, the survival branch index, and the corresponding VA output bits.

32. A network component configured for determining full channel state information from channel feedback from a station in a wireless system comprising:

a processor; and
a non-transitory computer readable storage medium storing programming for execution by the processor, the programming including instructions to:
receive channel feedback from a station, wherein the channel feedback comprises a trellis coded quantization (TCQ) information about a channel determined according to a normalized estimated channel parameters, wherein the normalized estimated channel parameters are determined according to a transmission power of the TP, a receiver power of the station, and path loss information; and
determine full channel state information according to the channel feedback.

33. The network component of claim 32, wherein the TCQ information comprises a survival branch index and corresponding Viterbi algorithm (VA) output bits, wherein the VA output bits are determined by the station by applying the VA to trellis codes mapped from channel estimation parameters of a signal received by the station.

34. The network component of claim 33, wherein the programming further comprises instructions to:
receive beginning state information from the station; and
retrieve a matching branch label according to the beginning state information, the survival branch index, and the corresponding VA output bits.

* * * * *